United States Patent
Chiang et al.

(10) Patent No.: US 8,829,850 B2
(45) Date of Patent: Sep. 9, 2014

(54) INTERACTIVE CHARGING MANAGEMENT SYSTEM AND METHOD THEREOF

(75) Inventors: Wen-Shu Chiang, Hsinchu County (TW); Chin-Pin Chien, Hsinchu County (TW); An-Hung Lin, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 844 days.

(21) Appl. No.: 13/029,122

(22) Filed: Feb. 17, 2011

(65) Prior Publication Data

US 2012/0161700 A1 Jun. 28, 2012

(30) Foreign Application Priority Data

Dec. 22, 2010 (TW) ................................ 99145259 A

(51) Int. Cl.
 H02J 7/00 (2006.01)
 B60L 3/04 (2006.01)
 B60L 11/18 (2006.01)
 B60L 3/00 (2006.01)

(52) U.S. Cl.
 CPC ............ *B60L 3/0069* (2013.01); *Y02T 10/7088* (2013.01); *Y02T 90/14* (2013.01); *Y02T 10/7005* (2013.01); *B60L 3/04* (2013.01); *B60L 11/1838* (2013.01); *Y02T 90/128* (2013.01); *Y02T 90/163* (2013.01)
 USPC .......................................... 320/109; 320/115

(58) Field of Classification Search
 USPC ................................. 320/109, 115
 See application file for complete search history.

(56) References Cited

U.S. PATENT DOCUMENTS

| 5,596,258 | A | * | 1/1997 | Kimura et al. ................. 320/163 |
| 5,600,524 | A | | 2/1997 | Neiger et al. |
| 6,225,776 | B1 | | 5/2001 | Chai |
| 7,576,960 | B2 | | 8/2009 | Gao et al. |
| 2006/0028178 | A1 | * | 2/2006 | Hobbs ........................... 320/128 |
| 2008/0007879 | A1 | | 1/2008 | Zaretsky et al. |
| 2010/0033140 | A1 | * | 2/2010 | Otake ........................... 320/165 |

FOREIGN PATENT DOCUMENTS

| CN | 101490920 | 7/2009 |
| CN | 101755371 | 6/2010 |
| JP | 2000354332 | 12/2000 |
| TW | 270976 | 2/1996 |

(Continued)

OTHER PUBLICATIONS

English translation of TW document 419097.*

(Continued)

*Primary Examiner* — Samuel Berhanu
(74) *Attorney, Agent, or Firm* — Jianq Chyun IP Office

(57) ABSTRACT

An interactive charging management system and a method thereof are provided. The present method includes following steps. A leakage event is detected when an electric vehicle is connected with a charging post. When the leakage event is not detected, the charging post is controlled to enter a charging state from a ready state, so as to continuously supply a charging power to the electric vehicle until the electric vehicle is completely charged. When the leakage event is detected, the charging post is controlled to stop supplying the charging power to the electric vehicle, and the electric vehicle is indicated to go offline, so as to perform a leakage test and determine whether to resume the ready state. When the charging post cannot resume the ready state, a service notice is issued to notify a curing unit to process.

15 Claims, 3 Drawing Sheets

(56) References Cited

FOREIGN PATENT DOCUMENTS

| | | |
|---|---|---|
| TW | 304313 | 5/1997 |
| TW | 419097 | 1/2001 |
| TW | M251284 | 11/2004 |

OTHER PUBLICATIONS

Richard C. Quick et al, "Ground Fault Circuit Interrupter—Design and Operating Characteristics", appears in: Industry Applications, IEEE Transactions, vol. IA-11 Issue:1, issued on Jan. 1975, p. 50-p. 55.

Edward L. Owen, "Power System Grounding Part II RCD & GFCI", IEEE Industry Applcations Magazine, issued on Jul. 1996, p. 71-p. 73.

Jaebok Lee et al, "Transient False Tripping Characteristic Analysis of Ground Fault Circuit Interrupter", 2004 International Conference on Power System Technology—Powercon 2004, Singapore, issued on Nov. 21-24, 2004, p. 522-p. 526.

"First Office Action of China Counterpart Application", issued on Dec. 25, 2013, p. 1-p. 8.

"Office Action of Taiwan Counterpart Application", issued on Dec. 17, 2013, p. 1-p. 5.

\* cited by examiner

INTERACTIVE CHARGING MANAGEMENT SYSTEM AND METHOD THEREOF

CROSS-REFERENCE TO RELATED APPLICATION

This application claims the priority benefit of Taiwan application serial no. 99145259, filed on Dec. 22, 2010. The entirety of the above-mentioned patent application is hereby incorporated by reference herein and made a part of this specification.

BACKGROUND

Technical Field

The disclosure relates to a charging management mechanism, and more particularly, to an interactive charging management system adaptable to an electric vehicle and a method thereof.

Since the industrial revolution, engines based on petrochemical energy sources have resolved the problems in transportation but also brought the issues of air pollution and greenhouse effect. Besides, along with the increase in the prices of petroleum products, it has become a global issue to find new energy and transportation resolutions. The idea of electric vehicles provides solutions in exhaust emission, air pollution, and greenhouse effect.

Generally speaking, electric vehicles (including plug-in hybrid electric vehicles) can be charged by the charging posts deployed in (or located at) parking places (for example, public or private parking lots and apartment buildings). Besides, leakage current breakers are usually equipped in today's charging posts. Thus, when a leakage event occurs (for example, in an electric vehicle) during the charging process of the electric vehicle, the leakage current breaker in the charging post is tripped so that the charging post stops supplying the charging power to the electric vehicle. However, the charging post cannot resume its ready (standby) state (i.e., the charging post is failed) in response to the tripping of the leakage current breaker. It increases the maintenance cost if the failed charging post has to be manually reset.

SUMMARY

Accordingly, the disclosure provides an interactive charging management system. The interactive charging management system is adaptable to at least one electric vehicle, and the electric vehicle is charged according to a charging power. The interactive charging management system includes at least one charging post and a far-end control center. The charging post is connected with the electric vehicle for detecting a leakage event. When the leakage event is not detected, the charging post enters a charging state from a ready state to continuously supply the charging power to the electric vehicle until the electric vehicle is completely charged. When the leakage event is detected, the charging post stops supplying the charging power to the electric vehicle and indicates the electric vehicle to go offline, so as to perform a leakage test and determine whether to resume the ready state. The far-end control center is connected with the charging post. When the charging post cannot resume the ready state, the far-end control center issues a service notice to notify a curing unit to process.

The disclosure also provides an interactive charging management method including following steps. A leakage event is detected when an electric vehicle is connected with a charging post. When the leakage event is not detected, the charging post is controlled to enter a charging state from a ready state, so as to continuously supply a charging power to the electric vehicle until the electric vehicle is completely charged. When the leakage event is detected, the charging post is controlled to stop supplying the charging power to the electric vehicle, and the electric vehicle is indicated to go offline, so as to perform a leakage test and determine whether to resume the ready state. When the charging post cannot resume the ready state, a service notice is issued to notify a curing unit to process.

It is to be understood that both the foregoing general description and the following detailed description are exemplary, and are intended to provide further explanation of the invention as claimed.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
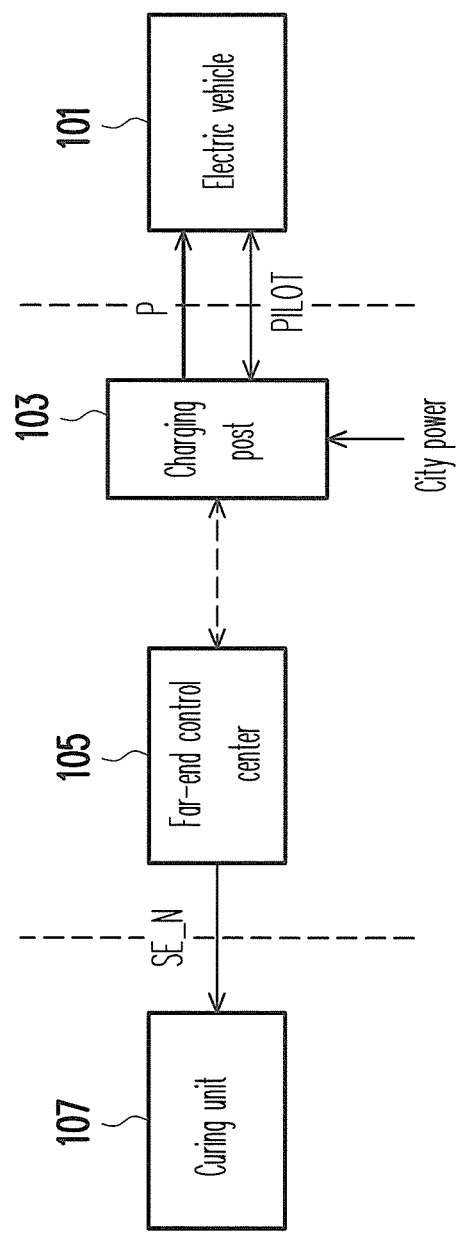
FIG. 1 is a schematic diagram of an interactive charging management system according to an exemplary embodiment of the disclosure.

Reference will now be made in detail to exemplary, embodiments of the disclosure, examples of which are illustrated in the accompanying drawings, wherein like reference numerals refer to the like elements throughout.

FIG. 1 is a schematic diagram of an interactive charging management system 10 according to an exemplary embodiment of the disclosure. Referring to FIG. 1, the interactive charging management system 10 is adaptable to at least one electric vehicle 101, and which includes at least one charging post 103 and a far-end control center 105. In the present exemplary embodiment, the electric vehicle 101 is charged by a charging power P supplied by the charging post 103.

The charging post 103 is connected with the electric vehicle 101 for detecting a leakage event. When the leakage event is not detected, the charging post 103 enters a charging state from a ready state to continuously supply the charging power P to the electric vehicle 101 until the electric vehicle 101 is completely charged. When the leakage event is detected (regardless of whether in the electric vehicle 101 or the charging post 103), the charging post 103 stops supplying the charging power P to the electric vehicle 101 and indicates the electric vehicle 101 to go offline (i.e., requests a connector of the electric vehicle 101 to be unplugged from a receptacle of the charging post 103), so as to perform a leakage test and determine whether to resume the ready state.

The far-end control center 105 can be connected with the charging post 103 in a wire or wireless manner. When the charging post 103 cannot resume the ready state (i.e., the charging post 103 fails to perform its intended functions), the far-end control center 105 issues a service notice SE_N to notify a curing unit 107 for subsequent processing (for example, repairing or checking the charging post 103).

Figure 2:
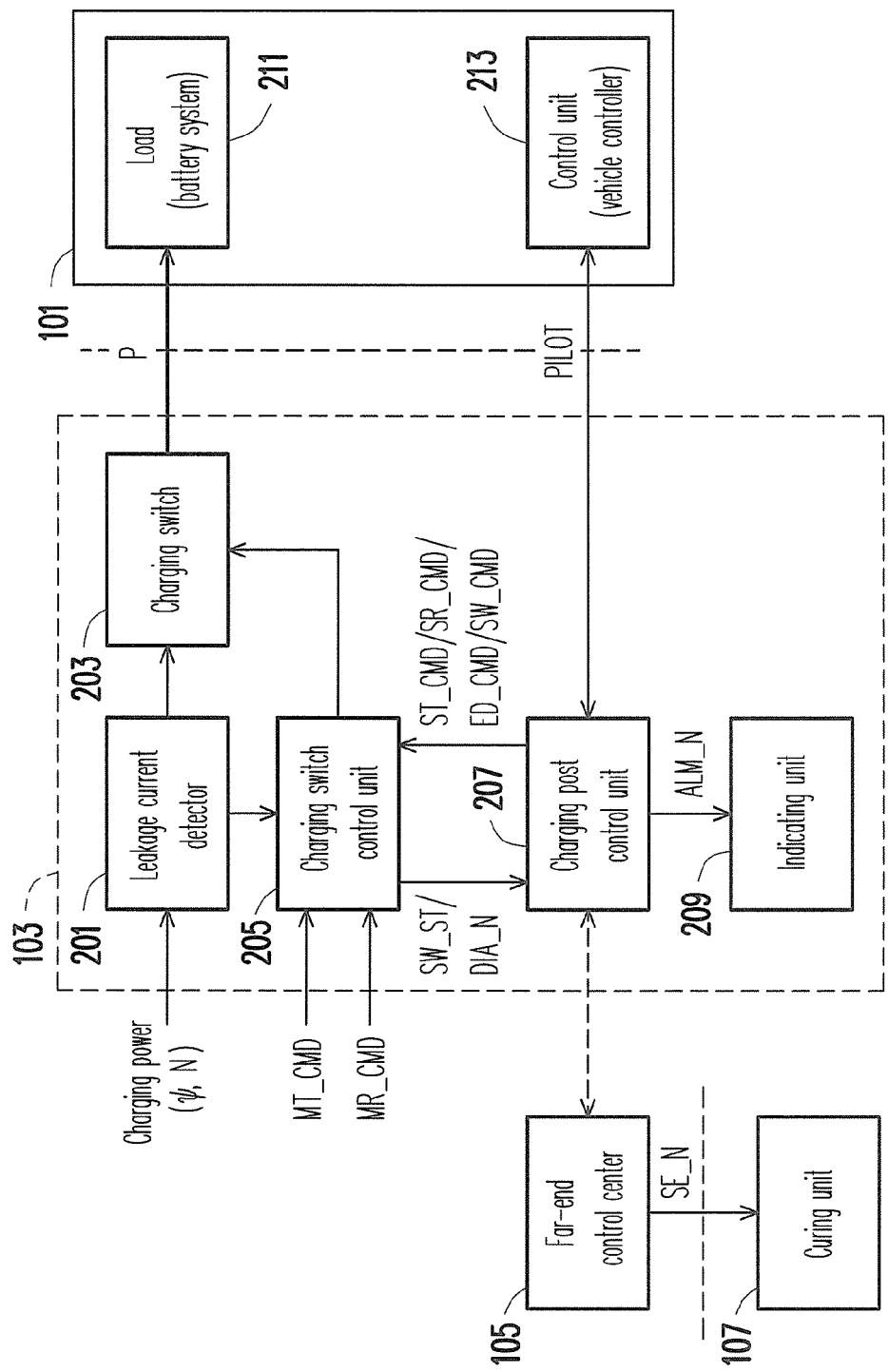
FIG. 2 is a detailed diagram of the interactive charging management system in FIG. 1.

To be specific, FIG. 2 is a detailed diagram of the interactive charging management system in FIG. 1. Referring to FIG. 2, in the present exemplary embodiment, the charging post 103 includes a leakage current detector 201, a charging switch 203, a charging switch control unit 205, a charging post control unit 207, and an indicating unit 209. The leakage current detector 201 receives a city power (φ, N) from Electric Power Company and detects whether the leakage event occurs.

The charging switch 203 is connected with the leakage current detector 201. When the leakage event is detected, the charging switch 203 stops conducting the charging power P to the load 211 of the electric vehicle 101 (for example, the battery system of the electric vehicle 101). When the leakage event is not detected (i.e., no leakage event occurs), the charging switch 203 conducts the charging power P to the load 211 of the electric vehicle 101. The charging switch control unit 205 is connected with the leakage current detector 201 and the charging switch 203. When the leakage event is detected, the charging switch control unit 205 controls the charging switch 203 to trip, so as to stop conducting the charging power P to the electric vehicle 101. Contrarily, when no leakage event is detected, the charging switch control unit 205 controls the charging switch 203 to turn on, so as to conduct the charging power P to the electric vehicle 101 until the electric vehicle 101 is completely charged.

The charging post control unit 207 is connected with the charging switch control unit 205. When the leakage event is detected, the charging post control unit 207 issues an alarm notice ALM_N and a self-test command ST_CMD so that the charging switch control unit 205 performs a leakage test in response to the self-test command ST_CMD. The indicating unit 209 (for example, a liquid crystal display module (LCM)) is connected with the charging post control unit 207. The indicating unit 209 indicates the electric vehicle 101 to go offline (i.e., requests the connector of the electric vehicle 101 to be unplugged from the receptacle of the charging post 103) in response to the alarm notice ALM_N.

In the present exemplary embodiment, the charging post control unit 207 performs bi-communication respectively with the far-end control center 105 and a control unit (i.e., a vehicle controller) 213 of the electric vehicle 101. Accordingly, when the connector of the electric vehicle 101 is plugged into the receptacle of the charging post 103, the leakage current detector 201 detects whether the leakage event occurs. When the leakage event is detected (i.e., leakage occurs in at least one of the electric vehicle 101 and the charging post 103), the charging switch control unit 205 controls the charging switch 203 to trip and issues a switch state SW_ST indicating that the charging switch 203 is already tripped to the charging post control unit 207.

Thereby, the charging post control unit 207 respectively issues the alarm notice ALM_N and the self-test command ST_CMD to the indicating unit 209 and the charging switch control unit 205. To be more specific, once the indicating unit 209 receives the alarm notice ALM_N, it indicates the electric vehicle 101 to go offline (i.e., requests the connector of the electric vehicle 101 to be unplugged from the receptacle of the charging post 103).

If the owner of the electric vehicle 101 has not unplugged the connector of the electric vehicle 101 from the receptacle of the charging post 103 under the indication of the indicating unit 209, the charging post control unit 207 issues a tripping switch command SW_CMD to the charging switch control unit 205 so that the charging switch control unit 205 controls the charging switch 203 to remain tripped. Moreover, if the connector of the electric vehicle 101 is still not unplugged from the receptacle of the charging post 103 after a predetermined time, the charging post control unit 207 notifies the far-end control center 105, and the far-end control center 105 notifies the curing unit 107 to send someone for processing the issue.

Additionally, if the owner of the electric vehicle 101 unplugs the connector of the electric vehicle 101 from the receptacle of the charging post 103 under the indication of the indicating unit 209 right away, the charging post control unit 207 issues a self-test command ST_CMD to the charging switch control unit 205. Accordingly, the charging switch control unit 205 performs a leakage test. If the charging switch control unit 205 determines that the leakage event is not induced by the charging post 103 after it performs the leakage test, it controls the charging post 103 to resume the ready state. Contrarily (i.e., the leakage event is induced by the charging post 103), the charging switch control unit 205 controls the charging switch 203 to remain tripped and notifies the far-end control center 105 through the charging post control unit 207, so that the far-end control center 105 issues a service notice SE_N to the curing unit 107 and the curing unit 107 sends someone to repair/check the charging post 103.

On the other hand, when no leakage event is detected (i.e., no leakage occurs in either the electric vehicle 101 or the charging post 103), the charging post control unit 207 further determines whether it can communicate with the control unit (i.e., vehicle controller) 213 of the electric vehicle 101 through a control pilot PILOT. If the charging post control unit 207 determines that it cannot communicate with the control unit 213 of the electric vehicle 101, the charging post control unit 207 issues an error diagnosis command ED_CMD to the charging switch control unit 205 so as to make the charging switch control unit 205 to perform an error diagnosis and issue a diagnosis notice DIA_N.

Thereby, the indicating unit 209 indicates the electric vehicle 101 to go online again (i.e., requests the connector of the electric vehicle 101 to be re-plugged into the receptacle of the charging post 103) in response to the diagnosis notice DIA_N. If the indicating unit 209 still indicates the electric vehicle 101 to go online after the connector of the electric vehicle 101 is re-plugged into the receptacle of the charging post 103, the charging post control unit 207 notifies the far-end control center 105 so that the far-end control center 105 notifies the curing unit 107 to send someone for processing the issue.

In addition, if the charging post control unit 207 determines that it can communicate with the control unit 213 of the electric vehicle 101, the charging post control unit 207 issues a turning-on switch command SW_CMD to the charging switch control unit 205. Accordingly, the charging switch control unit 205 controls the charging switch 203 to turn on, so that the charging switch 203 starts/continues to conduct the charging power P to the load 211 of the electric vehicle 101. Meanwhile, the leakage current detector 201 continuously detects the leakage event until the electric vehicle 101 is completely charged. In other words, the charging switch control unit 205 controls the charging switch 203 to trip, so as to make the charging post 103 to stop supplying the charging power P to the electric vehicle 101, as long as a leakage event occurs during the charging process of the electric vehicle 101.

After the electric vehicle 101 is completely charged, the charging post control unit 207 issues a tripping switch command SW_CMD to the charging switch control unit 205 so that the charging switch control unit 205 controls the charging switch 203 to trip, and controls the indicating unit 209 to indicate the electric vehicle 101 to go offline. After the electric vehicle 101 is completely charged and goes offline, the charging post control unit 207 further issues a self-reset command SR_CMD to make/ensure the charging post 103 enters the ready state from the charging state.

In the present exemplary embodiment, all the commands ST_CMD, SR_CMD, ED_CMD, and SW_CMD are issued by the charging post control unit 207 alone or by the charging post control unit 207 under the control of the far-end control center 105, which is determined according to the actual design requirement. In addition, the charging switch control unit 205 may also perform a leakage test (for example, pressing a test button (not shown) on the charging post 103) in response to a manual-test command MT_CMD. Similarly, the charging switch control unit 205 may control the charging post 103 to resume the ready state (for example, by pressing a reset button (not shown) on the charging post 103) in response to a manual-reset command MR_CMD.

Even though foregoing exemplary embodiment is described by referring to the interaction among a single electric vehicle, a single charging post, and the far-end control center, the interaction among multiple electric vehicles, multiple charging posts, and the far-end control center should be understood and implemented by those having ordinary knowledge in the art based on the description/teaching of foregoing exemplary embodiment therefore will not be described herein.

Figure 3:
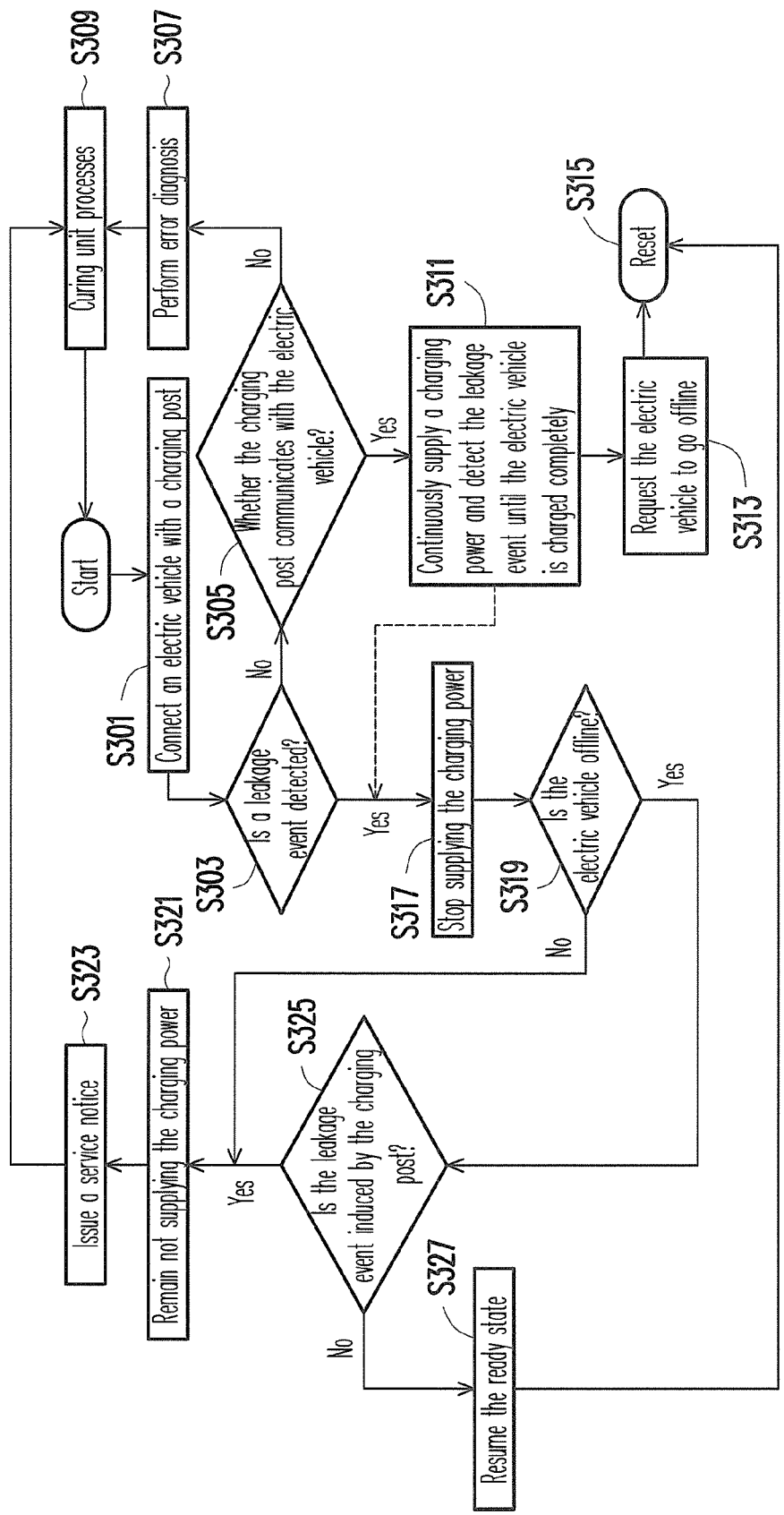
FIG. 3 is a flowchart of an interactive charging management method according to an exemplary embodiment of the disclosure.

Based on the disclosure/teaching of the above exemplary embodiments, FIG. 3 is a flowchart of an interactive charging management method according to an exemplary embodiment of the disclosure. Referring to FIG. 3, the interactive charging management method in the present exemplary embodiment (can be considered as the configured result of the interactive charging management system in foregoing exemplary embodiment) includes following steps.

When an electric vehicle is connected with a charging post (step S301), a leakage event is detected (step S303).

When the leakage event is not detected (i.e., "no" to step S303), whether the charging post and the electric vehicle can communicate with each other is determined (step S305) (through a control pilot).

If the charging post and the electric vehicle cannot communicate with each other (i.e., "no" to step S305), an error diagnosis is performed (step S307) to indicate the electric vehicle to go online again (i.e., request the connector of the electric vehicle to be re-plugged into the receptacle of the charging post), or a curing unit is notified (i.e., when the charging post and the electric vehicle still cannot communicate with each other after the connector of the electric vehicle is re-plugged into the receptacle of the charging post) (step S309).

If the charging post and the electric vehicle can communicate with each other (i.e., "yes" to step S305), the charging post is controlled to enter a charging state from a ready state, so as to continuously supply a charging power to the electric vehicle and continuously detect the leakage event until the electric vehicle is completely charged (step S311).

After the electric vehicle is completely charged, the electric vehicle is requested to go offline (i.e., the connector of the electric vehicle is requested to be unplugged from the receptacle of the charging post) (step S313), and the charging post is reset (step S315) and accordingly enters the ready state from the charging state, so that a next electric vehicle can be served.

On the other hand, when the leakage event is detected (i.e., "yes" to step S303) or a leakage event occurs during the charging process of the electric vehicle (i.e., step S311), the charging post is controlled to stop supplying the charging power to the electric vehicle (step S317). Besides, the electric vehicle is indicated to go offline, and whether the electric vehicle is offline is determined (i.e., whether the connector of the electric vehicle is unplugged from the receptacle of the charging post) (step S319).

If the connector of the electric vehicle is not unplugged from the receptacle of the charging post (i.e., "no" to step S319), the charging post is controlled to remain not supplying the charging power to the electric vehicle (step S321), and a service notice is issued after a predetermined time (step S323) to notify a curing unit for processing (i.e., sending someone to inspect (process) the issue) (step S309). However, if the connector of the electric vehicle is already unplugged from the receptacle of the charging post (i.e., "yes" to step S319), a leakage test is performed to determine whether the leakage event is induced by the charging post (step S325).

If it is determined after the leakage test that the leakage event is not induced by the charging post (i.e., "no" to step S325), the charging post is controlled to resume the ready state (step S327). Besides, the charging post is reset (step S315) to make/ensure that the charging post resumes the ready state. However, if it is determined after the leakage test that the leakage event is induced by the charging post (i.e., "yes" to step S325), the charging post is controlled to remain not supplying the charging power to the electric vehicle (step S321) (i.e., the charging post cannot resume the ready state), and a service notice is issued (step S323) to notify the curing unit for processing (for example, repairing or inspecting the charging post) (step S309).

In summary, in the interactive charging management system and the method thereof described in foregoing exemplary embodiments, a charging switch of a charging post is tripped when a leakage event occurs (regardless of whether in an electric vehicle or the charging post), so as to stop supplying a charging power to the electric vehicle, and the function of the charging post which is not leaking can be resumed according to commands issued by a far-end control center or the charging post itself (i.e., the charging post won't be failed by a leaking electric vehicle). Thereby, the maintenance cost is greatly reduced. Moreover, in the interactive charging management system and the method thereof described in foregoing exemplary embodiments, the leakage event and the charging state of the electric vehicle can be remotely monitored at the same time, so that the charging management performance of the electric vehicle can be greatly improved.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An interactive charging management system, adaptable to at least one electric vehicle, wherein the electric vehicle is charged according to a charging power, the interactive charging management system comprising:
at least one charging post, connected with the electric vehicle, for detecting a leakage event, wherein when the leakage event is not detected, the charging post enters a charging state from a ready state to continuously supply the charging power to the electric vehicle until the electric vehicle is charged completely, and when the leakage event is detected, the charging post stops supplying the charging power to the electric vehicle and indicates the electric vehicle to go offline, so as to perform a leakage test and determine whether to resume the ready state; and a far-end control center, connected with the charging post, for issuing a service notice to notify a curing unit when the charging post cannot resume the ready state.

2. The interactive charging management system according to claim 1, wherein the charging post comprises:

a leakage current detector, for receiving power from power grid and detecting the leakage event;

a charging switch, connected with the leakage current detector, for not conducting the charging power to the electric vehicle when the leakage event is detected and conducting the charging power to the electric vehicle when the leakage event is not detected;

a charging switch control unit, connected with the leakage current detector and the charging switch, for controlling the charging switch to trip and not conduct the charging power to the electric vehicle when the leakage event is detected, and for controlling the charging switch to turn on and conduct the charging power to the electric vehicle until the electric vehicle is charged completely when the leakage event is not detected;

a charging post control unit, connected with the charging switch control unit, for issuing an alarm notice and a self-test command when the leakage event is detected, so as to make the charging switch control unit to perform the leakage test in response to the self-test command; and an indicating unit, connected with the charging post control unit, for indicating the electric vehicle to go offline in response to the alarm notice.

3. The interactive charging management system according to claim 2, wherein the charging switch control unit further controls the charging post to resume the ready state in response to a self-reset command.

4. The interactive charging management system according to claim 3, wherein the charging switch control unit further issues a diagnosis notice in response to an error diagnosis command, so as to make the indicating unit to indicate the electric vehicle to go online again in response to the diagnosis notice, or notifies the curing unit to process through the far-end control center.

5. The interactive charging management system according to claim 4, wherein the charging switch control unit further controls the charging switch to turn on or trip in response to a switch command.

6. The interactive charging management system according to claim 5, wherein the commands are issued by the charging post control unit or in response to operations of the far-end control center.

7. The interactive charging management system according to claim 2, wherein the charging switch control unit further performs the leakage test in response to a manual-test command.

8. The interactive charging management system according to claim 7, wherein when the charging switch control unit determines after performing the leakage test that the leakage event is not induced by the charging post, the charging switch control unit controls the charging post to resume the ready state, and when the charging switch control unit determines after performing the leakage test that the leakage event is induced by the charging post, the charging switch control unit controls the charging switch to remain tripped.

9. The interactive charging management system according to claim 7, wherein the charging switch control unit further controls the charging post to resume the ready state in response to a manual-reset command.

10. The interactive charging management system according to claim 2, wherein the charging post control unit performs bi-communication respectively with the far-end control center and the electric vehicle.

11. An interactive charging management method, comprising:

detecting a leakage event when an electric vehicle is connected with a charging post;

when the leakage event is not detected, controlling the charging post to enter a charging state from a ready state, so as to continuously supply a charging power to the electric vehicle until the electric vehicle is charged completely, and when the leakage event is detected, controlling the charging post to stop supplying the charging power to the electric vehicle and indicate the electric vehicle to go offline, so as to perform a leakage test and determine whether to resume the ready state;

when the charging post cannot resume the ready state, issuing a service notice to notify a curing unit to process.

12. The interactive charging management method according to claim 11, wherein when the leakage event is not detected, the interactive charging management method further comprises:

determining whether the charging post and the electric vehicle can communicate with each other.

13. The interactive charging management method according to claim 12, wherein when the charging post and the electric vehicle cannot communicate with each other, an error diagnosis is performed to indicate the electric vehicle to go online again, or the curing unit is notified to process, and when the charging post and the electric vehicle can communicate with each other, the charging power is continuously supplied to the electric vehicle and the leakage event is continuously detected until the electric vehicle is charged completely.

14. The interactive charging management method according to claim 13, wherein after the electric vehicle is charged completely, the interactive charging management method further comprises:

requesting the electric vehicle to go offline, and resetting the charging post to make the charging post to enter the ready state from the charging state.

15. The interactive charging management method according to claim 11, wherein when it is determined that the leakage event is not induced by the charging post after the leakage test is performed, the charging post is controlled to resume the ready state, and when it is determined that the leakage event is induced by the charging post after the leakage test is performed, the charging post is controlled to remain not supplying the charging power to the electric vehicle.

* * * * *